United States Patent
Jiang et al.

(10) Patent No.: US 8,892,029 B2
(45) Date of Patent: Nov. 18, 2014

(54) METHOD FOR BUFFER STATUS REPORT REPORTING, RELAY NODE, E-UTRAN NODEEB, AND SYSTEM

(75) Inventors: Yi Jiang, Shenzhen (CN); Wei Quan, Shenzhen (CN); Zhongbin Qin, Warsaw (PL)

(73) Assignee: Huawei Technologies Co., Ltd., Shenzhen (CN)

( * ) Notice: Subject to any disclaimer, the term of this patent is extended or adjusted under 35 U.S.C. 154(b) by 303 days.

(21) Appl. No.: 13/401,481

(22) Filed: Feb. 21, 2012

(65) Prior Publication Data

US 2012/0149298 A1 Jun. 14, 2012

Related U.S. Application Data

(63) Continuation of application No. PCT/CN2010/076188, filed on Aug. 20, 2010.

(30) Foreign Application Priority Data

Aug. 21, 2009 (CN) .......................... 2009 1 0189614

(51) Int. Cl.
*H04B 7/14* (2006.01)
*H04B 7/15* (2006.01)
*H04W 72/00* (2009.01)
*H04W 72/12* (2009.01)
*H04B 7/26* (2006.01)
*H04W 84/04* (2009.01)

(52) U.S. Cl.
CPC ......... *H04W 72/1252* (2013.01); *H04B 7/2606* (2013.01); *H04W 72/1284* (2013.01); *H04W 84/047* (2013.01)

USPC ................ 455/7; 455/11.1; 455/15; 455/450

(58) Field of Classification Search
CPC ..................................................... H04B 7/2606
USPC ............................................. 455/7, 9, 16, 15
See application file for complete search history.

(56) References Cited

U.S. PATENT DOCUMENTS

| | | | |
|---|---|---|---|
| 8,401,068 B2* | 3/2013 | Ulupinar et al. | 375/240 |
| 8,462,746 B2* | 6/2013 | Bitran et al. | 370/338 |
| 2009/0191882 A1* | 7/2009 | Kovacs et al. | 455/450 |
| 2009/0196177 A1* | 8/2009 | Teyeb et al. | 370/231 |

FOREIGN PATENT DOCUMENTS

| | | |
|---|---|---|
| CN | 101150426 A | 3/2008 |
| CN | 101197682 A | 6/2008 |

(Continued)

OTHER PUBLICATIONS

Office Action issued in corresponding Chinese Patent Application No. 200910189614.8, mailed Mar. 14, 2013.

(Continued)

*Primary Examiner* — Tilahun B Gesesse
(74) *Attorney, Agent, or Firm* — Brinks Gilson & Lione

(57) ABSTRACT

The present invention discloses a method for BSR reporting, a relay node, an E-UTRAN NodeB, and a system, which are applied in the field of communications. In the present invention, a BSR reporting manner of an RN is configured according to the number of UEs managed by the RN, and a BSR is sent to a D-eNB Donor eNB according to the configured BSR reporting manner. The present invention effectively solves the problem that currently the existing BSR mechanism is not applicable to an interface between an RN and a D-eNB.

16 Claims, 6 Drawing Sheets

(56) References Cited

FOREIGN PATENT DOCUMENTS

| CN | 101282173 | A | | 10/2008 | |
|---|---|---|---|---|---|
| CN | 101426175 | A | | 5/2009 | |
| CN | 101426175 | | * | 6/2009 | .............. H04W 4/06 |
| CN | 101483918 | A | | 7/2009 | |
| EP | 2048904 | A1 | | 4/2009 | |
| WO | WO 2009/095814 | A1 | | 8/2009 | |

OTHER PUBLICATIONS

Extended European Search Report issued in corresponding European Patent Application No. 10809577.9, mailed Apr. 23, 2012.

Written Opinion of the International Searching Authority issued in corresponding PCT Patent Application No. PCT/CN2010/076188, mailed Dec. 9, 2010.

International Search Report issued in corresponding PCT Patent Application No. PCT/CN2010/076188, mailed Dec. 9, 2010.

ETRI, "Consideration on MAC Procedures for Un Interface" Agenda Item: 7.4 Relays, 3GPP TSG RAN WG2 #66bis. Los Angeles, Jun. 29-Jul. 3, 2009.

Office Action issued in corresponding Chinese Patent Application No. 200910189614.8, mailed Aug. 31, 2012.

* cited by examiner

METHOD FOR BUFFER STATUS REPORT REPORTING, RELAY NODE, E-UTRAN NODEEB, AND SYSTEM

CROSS-REFERENCE TO RELATED APPLICATIONS

This application is a continuation of International Application No. PCT/CN2010/076188, filed on Aug. 20, 2010, which claims priority to Chinese Patent Application No. 200910189614.8, filed on Aug. 21, 2009, both of which are hereby incorporated by reference in their entireties.

FIELD OF THE INVENTION

The present invention relates to communications technologies, and in particular, to a method for BSR reporting, a relay node, an E-UTRAN NodeB, and a system.

BACKGROUND OF THE INVENTION

An LTE-Advance (Long Term Evolved-Advance, long term evolved-advance) network is a communication network on which manufacturers are researching actively, and is an advancement of the LTE network, the objective of which is to provide a low-cost network capable of reducing time delay, improving a user data rate, and increasing system capacity and coverage.

As an advanced technology in the LTE-A, the relay technology may improve a data rate of an edge user and a spectral utilization rate of the system and increase the system capacity and coverage through a method of setting up an RN (Relay Node, relay node) between a UE (User Equipment, user equipment) and an eNB (E-UTRAN NodeB, E-UTRAN NodeB). The eNB communicating with an RN is called D-eNB (Donor eNB, donor eNB). An interface between the UE and the RN is called a Uu interface, and an interface between the RN and the D-eNB is called a Un interface. When the Un interface and the Uu interface share a part of frequency resources, and when downlink data is sent, an MBSFN (Multicast Broadcast Single Frequency Network, multicast broadcast single frequency network sub-frame) is used at the Un interface, and a non-MBMSFN sub-frame is used at the Uu interface.

According to the existing interface protocols, the UE reports an amount of uplink data, required to be transmitted, of the UE by sending a BSR (Buffer Status Report, buffer status report) to the eNB, so as to request the eNB to allocate uplink transmission resources to the UE. The eNB performs grouping on the UE according to a priority level of an RB (Radio Bearer, radio bearer) corresponding to a current service of the UE, and the UE reports to the eNB by group. After the BSR is triggered, if the UE is configured with dedicated SR (Scheduling Request, scheduling request) resources, the UE sends an SR request message to the eNB through the dedicated SR resources, to request the eNB to allocate resources, which are for sending the BSR, to the UE. After the eNB receives the SR request message, uplink transmission grant, which is used by the UE to send a BSR request, is allocated to the UE according to a scheduling result.

Currently, the existing method for BSR reporting is not applicable to the interface between the RN and the D-eNB, and no reasonable method for BSR reporting used between the RN and the D-eNB exists in the prior art either.

SUMMARY OF THE INVENTION

Embodiments of the present invention provide a method for BSR reporting, a relay node, and a system. By designing a set of reasonable methods for BSR reporting applicable to the interface between an RN and a D-eNB, the problem that the existing BSR mechanism is not applicable to the interface between the RN and the D-eNB can be effectively solved.

An embodiment of the present invention provides a method for buffer status report BSR reporting, and a BSR reporting manner of an RN is configured according to the number of user equipments UEs managed by the relay node RN, so that the RN sends a BSR to a Donor eNB D-eNB according to the configured BSR reporting manner.

An embodiment of the present invention provides another method for buffer status report BSR reporting, and a BSR reporting manner of an RN is configured according to the number of user equipments UEs managed by the relay node RN, and a BSR is sent to a Donor eNB D-eNB according to the configured BSR reporting manner.

An embodiment of the present invention provides a Donor eNB D-eNB, and the Donor eNB D-eNB includes a configuring module and a sending module. The configuring module is configured to configure, according to the number of user equipments UEs managed by a relay node RN, a BSR reporting manner of the RN for the RN; and the sending module is configured to send the configured BSR reporting manner to the RN, so that the RN configures the BSR reporting manner, and sends a BSR to the Donor eNB D-eNB according to the configured BSR reporting manner.

An embodiment of the present invention provides a relay node RN, and the relay node RN includes a judging module and a second sending module. The judging module is configured to configure a BSR reporting manner of the RN according to the number of user equipments UEs managed by the RN; and the second sending module is configured to send a BSR to a Donor eNB D-eNB according to the configured BSR reporting manner.

An embodiment of the present invention provides a system for buffer status report BSR reporting, and the system includes a relay node RN and a Donor eNB D-eNB. The D-eNB is connected to the RN in a communication-enabled manner. The D-eNB is configured to configure a BSR reporting manner of the RN according to the number of UEs managed by an RN managed by the D-eNB, and send the configured BSR reporting manner to the RN, so that the RN configures the BSR reporting manner, and sends a BSR to the D-eNB according to the configured BSR reporting manner.

An embodiment of the present invention provides a buffer reporting method. A relay node RN determines a user equipment UE required to be scheduled and with channel quality greater than a preset channel quality threshold value, adds up the amount of data required to be scheduled of the UE or adds up the amount of data that is required to be scheduled but not received, and bears an adding result in a buffer status report BSR sent to a Donor eNB D-eNB.

The RN determines the UE required to be scheduled and with channel quality greater than the preset channel quality threshold value. The RN performs grouping according to priority levels of data required to be scheduled, adds up the amount of the grouped data by group, and bears a group adding result in the BSR sent to the D-eNB.

An embodiment of the present invention provides another relay node RN. The relay node includes a second determining module, an accumulating module, and a third sending module.

The second determining module is configured to determine a user equipment UE required to be scheduled and with channel quality greater than a preset channel quality threshold value. The accumulating module is configured to add up the amount of data required to be scheduled of the UE or add up the amount of data required to be scheduled but not received when the user equipment UE required to be scheduled and with the channel quality greater than the preset channel quality threshold value is determined. The third sending module is configured to bear an adding result in a buffer status report BSR sent to a Donor eNB D-eNB.

An embodiment of the present invention provides a resource allocation method. According to resource information that is reported by a relay node RN, of an interface between a user equipment UE and a relay node RN, resources of the interface between the UE and the RN and an interface between the RN and a D-eNB are re-allocated.

An embodiment of the present invention provides yet another Donor eNB D-eNB. The D-eNB includes a receiving module and an allocating module. The receiving module is configured to receive resource information that is reported by a relay node RN, of an interface between terminal equipment UE and the relay node RN. The allocating module is configured to re-allocate resources of the interface between the UE and the RN and an interface between the RN and a D-eNB according to the resource information that is reported by the relay node RN, of the interface between the terminal equipment UE and the relay node RN.

In the embodiments of the present invention, a set of reasonable methods for BSR reporting applicable to the interface between the RN and the D-eNB is designed. Compared with the method in the prior art where a method for a UE to send a BSR to an eNB is directly applied in the scenario where an RN sends a BSR to the eNB, time delay of sending uplink data in a network including a relay node may be reduced; channel overheads may be decreased; and accuracy of sending, by the RN, a report to a D-eNB may be improved.

BRIEF DESCRIPTION OF THE DRAWINGS

To illustrate the technical solutions of the embodiments of the present invention more clearly, the accompanying drawings for describing the embodiments are introduced briefly in the following. Apparently, the accompanying drawings in the following description are only some embodiments of the present invention, and persons of ordinary skill in the art may further derive other drawings according to these accompanying drawings without creative efforts.

DETAILED DESCRIPTION OF THE EMBODIMENTS

The following embodiments of the present invention are described through an example of a two-hop network including a relay node, and it should be understood by persons skilled in the art that the network architecture is not intended to limit the present invention.

Figure 1:
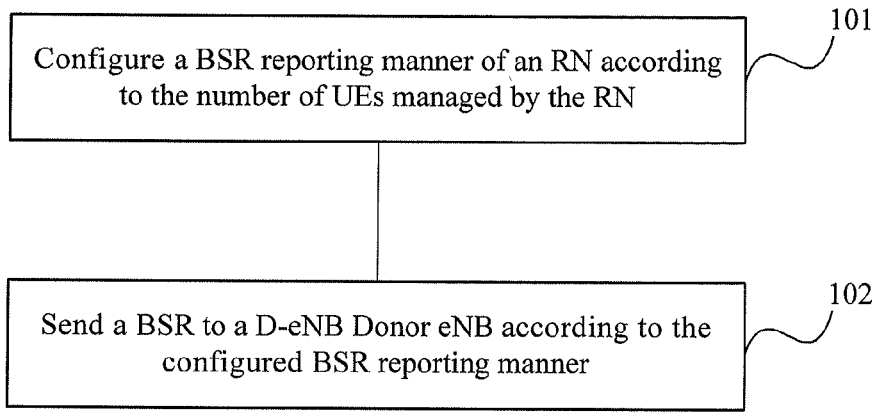
FIG. 1 is a flow chart of a method for BSR reporting according to an embodiment of the present invention.

A method for BSR reporting provided by an embodiment of the present invention is illustrated below in detail with reference to FIG. 1. As shown in FIG. 1, Step 101: Configure a BSR reporting manner of an RN according to the number of UEs managed by the RN.

Step 102: Send a BSR to a D-eNB Donor eNB according to the configured BSR reporting manner.

In the embodiment of the present invention, a set of reasonable methods for BSR reporting applicable to the interface between the RN and the D-eNB is designed, so that the configuration of the reporting manner of reporting, by the D-eNB, the BSR to the RN without changing the existing network process is completed. The corresponding BSR reporting manner is configured according to the number of the UEs managed by the RN, which may decrease control channel overheads, reduce signaling time delay, and improve accuracy of sending, by the RN, a report to the D-eNB.

Figure 2:
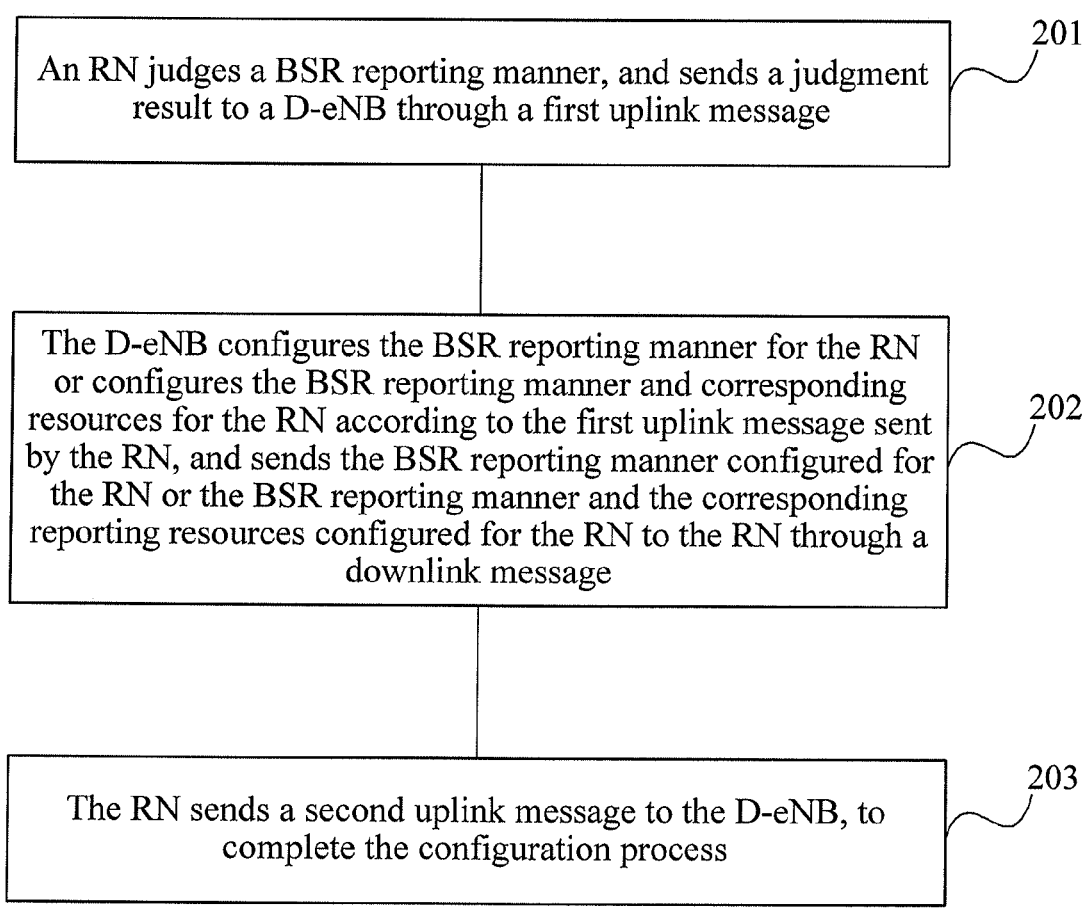
FIG. 2 is a flow chart of a configuration method of a BSR reporting manner according to an embodiment of the present invention.

A configuration method of a BSR reporting manner provided by an embodiment of the present invention is illustrated below with reference to FIG. 2.

Step 201: An RN judges a BSR reporting manner, and sends a judgment result to a D-eNB through a first uplink message. Optionally, the first uplink message may be an RRC Connection Reconfiguration Request (RRC connection reconfiguration request) message, and the message is used to request the D-eNB to configure the BSR reporting manner for the RN, or used to request the D-eNB to configure the BSR reporting manner and corresponding resources for the RN.

A method for the RN to judge the BSR reporting manner includes: determining, by the RN according to the number of the UEs managed by the RN, that the BSR reporting manner to be employed is a BSR reporting manner of periodic reporting or a BSR reporting manner of SR request; if the number of the UEs managed by the RN is greater than a preset first threshold value, employing the BSR reporting manner of periodic reporting, and determining, by the RN, the length of a reporting period according to the number of the UEs managed by the RN; if the number of the UEs managed by the RN is not greater than the preset first threshold value, employing the BSR reporting manner of SR request, and configuring dedicated SR resources.

The preset first threshold value may be configured by the D-eNB for the RN, and may also be a fixed value set in the RN.

The judgment result includes: if it is judged that the BSR reporting manner is the BSR manner of periodic reporting, the judgment result includes the periodic reporting manner and a period length for reporting; if the BSR reporting manner of SR request is employed, the judgment result includes the SR request reporting manner and resource for sending an SR request.

Optionally, the RN may further request, through the first uplink message, the D-eNB to configure a BSR reporting manner of high priority level BSR for the RN. The high priority level BSR reporting manner may be applied in the BSR periodic reporting manner, and may also applied in the SR request reporting manner. A priority level of sending the high priority level BSR is higher than that of sending a BSR by using the BSR reporting manner of periodic reporting or the BSR reporting manner of SR request. A sending manner of the high priority level BSR may be as follows. When detecting that a UE managed by the RN has high priority level data to be sent, the RN triggers reporting of high priority level BSR. Specifically the triggering the reporting of high priority level BSR is: receiving, by the RN, a high priority level BSR sent by the UE managed by the RN or receiving the high priority level data sent by the UE managed by the RN. After the high priority level BSR of the RN is triggered, a BSR state of the RN is set to already triggering the high priority level BSR. The reporting of high priority level BSR is not limited by the BSR state of the RN. The BSR state specifically refers to the following. When the RN already has a BSR reporting manner that is configured to be the reporting manner of SR request, in a time counting period of a timer of forbidding sending the SR request: when the high priority level BSR of the RN is triggered, the BSR state of the RN is already triggering the high priority level BSR, and an SR is sent to request for BSR reporting resources; when the RN already has a BSR reporting manner that is configured to be the periodic reporting manner, and when the high priority level BSR of the RN is between two BSR reporting times, the manner of triggering the SR may be used to request for the BSR reporting resources.

Step 202: The D-eNB configures the BSR reporting manner for the RN or configures the BSR reporting manner and corresponding resources for the RN according to the first uplink message sent by the RN, and sends the BSR reporting manner configured for the RN or the BSR reporting manner and the corresponding reporting resources configured for the RN to the RN through a downlink message. Optionally, the downlink message may be an RRC Connection Reconfiguration message (RRC connection reconfiguration message).

If the BSR reporting manner requested by the RN is the BSR reporting manner of periodic reporting, the BSR reporting manner configured by the D-eNB for the RN may be the BSR reporting manner of periodic reporting, and the period length for reporting is configured. The period length may be the period requested by the RN, or the period generated according to the period requested by the RN and an actual network situation. Optionally, the D-eNB may further configure resources, which are used for performing BSR periodic reporting, for the RN in the downlink message. The resources for performing the BSR periodic reporting may also be configured through an R-PDCCH channel. If the BSR reporting manner requested by the RN is the BSR reporting manner of SR request, the BSR reporting manner configured by the D-eNB for the RN may be the BSR reporting manner of SR request, and resources for sending an SR message are configured. Optionally, the D-eNB may further configure a first timer for the RN. The first timer is configured to forbid, within a time counting period of the first timer, the RN triggering the SR request triggered by the reporting manner of SR request, thereby preventing the RN from sending SR request information to the D-eNB too frequently.

If the BSR reporting manner configured by the D-eNB for the RN is the BSR reporting manner of periodic reporting, and the high priority level BSR reporting manner is configured for the RN according to the first uplink message sent by the RN, the D-eNB may configure dedicated SR resources or fixed competition resources for the high priority level BSR reporting manner. The fixed competition resources may also be configured by the D-eNB through a system message. The fixed competition resources may also be configured by the D-eNB through an R-PDCCH channel. If the BSR reporting manner configured by the D-eNB for the RN is the BSR reporting manner of SR request, and the high priority level BSR reporting manner is configured for the RN according to the first uplink message sent by the RN, the D-eNB may configure fixed competition resources for the high priority level BSR reporting manner. The fixed competition resources may also be configured by the D-eNB through a system message. The fixed competition resources may also be configured by the D-eNB through an R-PDCCH channel.

Step 203: The RN sends a second uplink message to the D-eNB, to complete the configuration process. The second uplink message may be an RRC Connection Reconfiguration Complete message (RRC connection reconfiguration complete message).

In the embodiment of the present invention, the configuration of the reporting manner of reporting, by the D-eNB, the BSR to the RN without changing the existing network process is completed. The corresponding BSR reporting manner is configured according to the number of the UEs managed by the RN, which may decrease control channel overheads, reduce signaling time delay, and improve accuracy of sending, by the RN, a report to the D-eNB.

Figure 3:
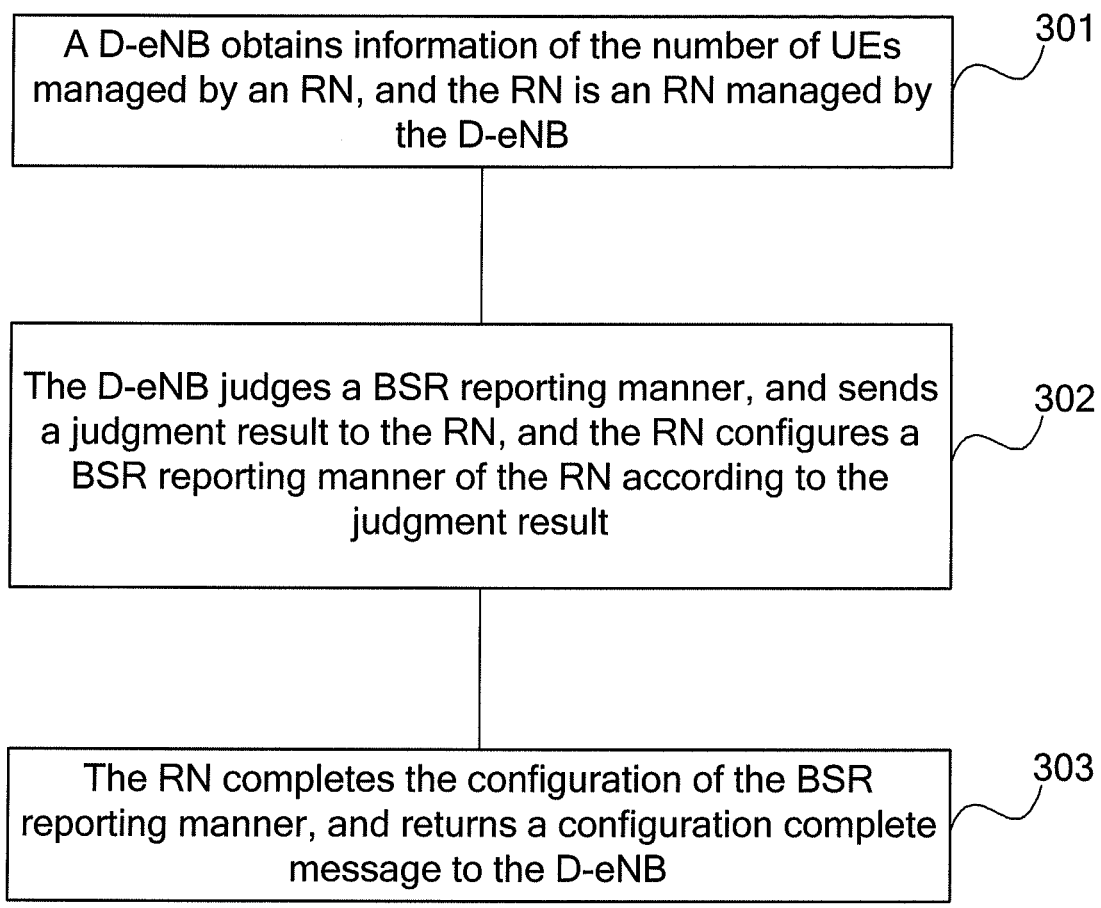
FIG. 3 is a flow chart of a configuration method of another BSR reporting manner according to an embodiment of the present invention.

A configuration method of another BSR reporting manner provided by an embodiment of the present invention is illustrated below in detail with reference to FIG. 3.

Step 301: A D-eNB obtains information of the number of UEs managed by an RN. The RN is an RN managed by the D-eNB.

Optionally, the RN may send an RRC Connection Reconfiguration Request message to the D-eNB, to report the information of the number of the UEs managed by the RN to the D-eNB; or after an RRC connection is set up between the RN and the D-eNB, the RN reports the information of the number of the UEs managed by the RN to the D-eNB through an uplink message; or when the number of the UEs managed by the RN changes and the number change reaches a preset threshold, the RN reports the information of the number of the UEs managed by the RN to the D-eNB through an uplink message.

Step 302: The D-eNB judges a BSR reporting manner, and sends a judgment result to the RN, and the RN configures a BSR reporting manner of the RN according to the judgment result.

Optionally, the D-eNB may send the judgment result to the RN through an RRC Connection Reconfiguration message.

A method for the D-eNB to judge the BSR reporting manner is as follows. The D-eNB determines, according to the number of the UEs managed by the RN managed by the D-eNB, whether the BSR reporting manner of periodic reporting or the BSR reporting manner of SR request is to be employed. If the number of the UEs is greater than a preset third threshold value, the BSR reporting manner of periodic reporting is employed, and the D-eNB determines the length of an RN reporting period according to the number of the UEs. If the number of the UEs is not greater than the preset third threshold value, the BSR reporting manner of SR request is employed. The uplink message may be an RRC Connection Reconfiguration Request message. Optionally, the D-eNB may also directly obtain the number of the UEs managed by the RN managed by the D-eNB or a change of the number. If the UEs are fixed user equipments, the D-eNB may pre-configure the number of the UEs managed by the RN managed by the D-eNB.

The preset third threshold value may be set to vary according to a network situation, and may also be a fixed value.

The RN may set the BSR reporting manner of high priority level BSR. The high priority level BSR reporting manner may be applied in the BSR periodic reporting manner, and may also applied in the SR request reporting manner. Moreover, a priority level of sending the high priority level BSR is higher than sending a BSR by using the BSR reporting manner of periodic reporting or the reporting manner of SR request. When detecting that a UE managed by the RN has high priority level data to be sent, the RN triggers reporting of high priority level BSR. Specifically the detecting that the UE managed by the RN has the high priority level data to be sent is: receiving, by the RN, a high priority level BSR sent by the UE managed by the RN or receiving the high priority level data sent by the UE managed by the RN. When the high priority level BSR of the RN is triggered, a BSR state of the RN is set to already triggering the high priority level BSR. The reporting of high priority level BSR is not limited by the BSR state of the RN. The BSR state specifically refers to the following. When the RN already has a BSR reporting manner that is configured to be the reporting manner of SR request, in a time counting period of a timer of forbidding sending the SR request: when the high priority level BSR of the RN is triggered, the BSR state of the RN is already triggering the high priority level BSR, and an SR is sent to request for BSR reporting resources; when the RN already has a BSR reporting manner that is configured to be the periodic reporting manner, and when the high priority level BSR of the RN is between two BSR reporting times, the manner of triggering the SR may be used to request for the BSR reporting resources.

If the judgment result of the D-eNB is that the BSR reporting manner of the RN is the BSR reporting manner of periodic reporting, the BSR reporting manner configured by the D-eNB for the RN may be the BSR reporting manner of periodic reporting, and the period length for reporting is configured. Optionally, the D-eNB may further configure resources, which are used for performing BSR periodic reporting, for the RN. The resources for performing the periodic reporting may also be configured through an R-PDCCH channel. If the judgment result is that the BSR reporting manner of the RN is the BSR reporting manner of SR request, the BSR reporting manner configured by the D-eNB for the RN may be the BSR reporting manner of SR request, and resources for sending an SR message are configured. Optionally, a first timer may further be configured. The first timer is configured to forbid the RN triggering the SR request triggered by the reporting manner of SR request, thereby preventing the RN from sending SR request information to the D-eNB too frequently.

If the BSR reporting manner configured by the D-eNB for the RN is the BSR reporting manner of periodic reporting, and the high priority level BSR reporting manner is configured for the RN, the D-eNB may configure dedicated SR resources or fixed competition resources for the high priority level BSR reporting manner. The fixed competition resources may also be configured by the D-eNB through a system message. The fixed competition resources may also be configured by the D-eNB through an R-PDCCH channel. If the BSR reporting manner configured by the D-eNB for the RN is the BSR reporting manner of SR request, and the high priority level BSR reporting manner is configured for the RN according to the first uplink message sent by the RN, the D-eNB may configure fixed competition resources for the high priority level BSR reporting manner. The fixed competition resources may also be configured by the D-eNB through a system message. The fixed competition resources may also be configured by the D-eNB through an R-PDCCH channel.

Step 303: The RN completes the configuration of the BSR reporting manner, and returns a configuration complete message to the D-eNB.

Optionally, the RN may send an RRC Connection Reconfiguration Complete message to the D-eNB to notify the D-eNB that the RN completes the configuration of the BSR reporting manner.

An embodiment of the present invention provides another method for configuring a BSR reporting manner of an RN, thereby improving flexibility of configuration.

Figure 4:
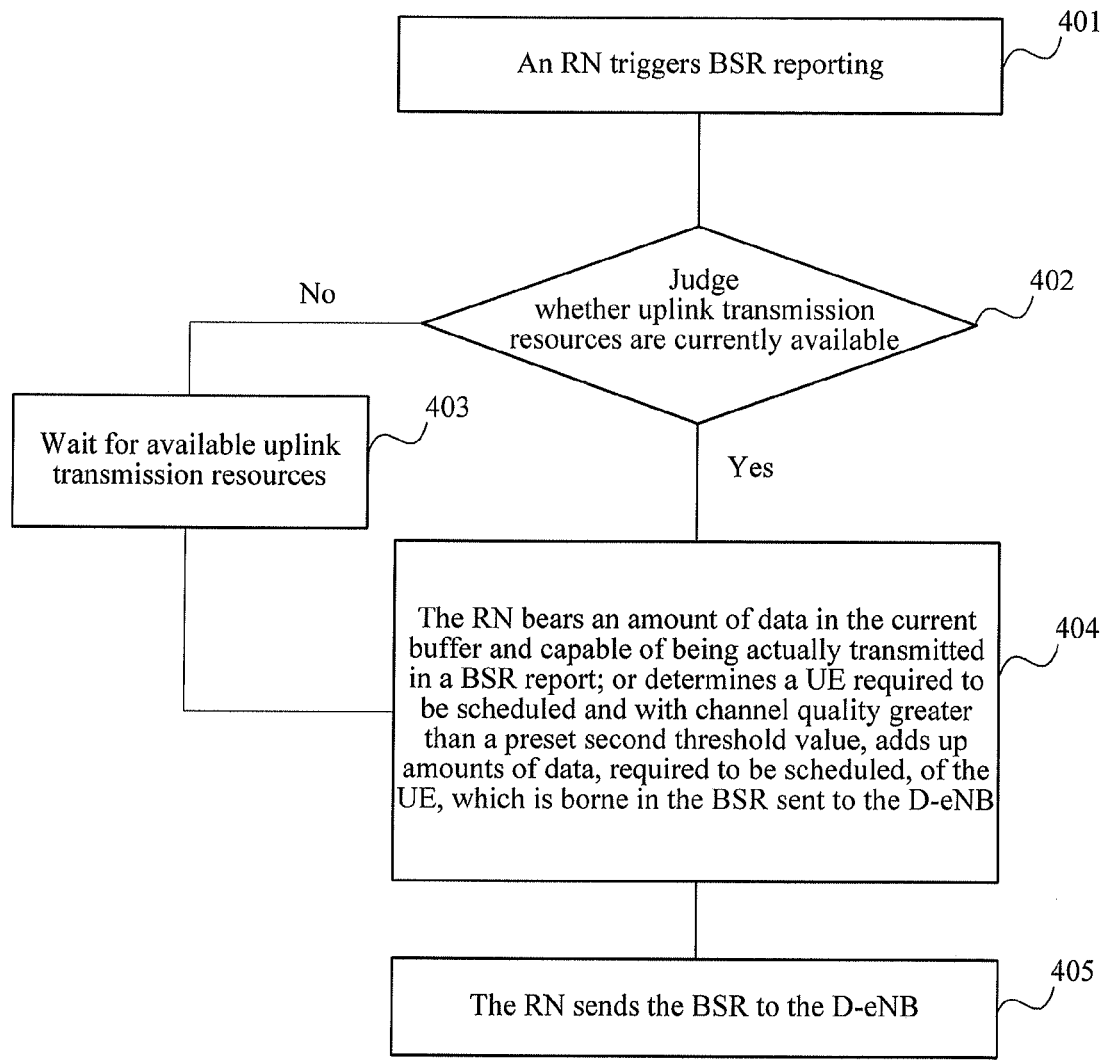
FIG. 4 is a flow chart of yet another method for BSR reporting according to an embodiment of the present invention.

A process of reporting, by an RN, a BSR to a D-eNB is illustrated below in detail with reference to FIG. 4.

Step 401: An RN triggers BSR reporting.

A condition of the triggering, by the RN, the BSR reporting may be as follows.

When the RN receives a BSR reported by a UE or uplink data sent by the UE, the RN triggers the BSR reporting, and set a BSR reporting state to already triggering a conventional BSR.

If the RN configures the BSR reporting manner of periodic reporting, the RN sends the BSR of the RN to the D-eNB during a periodic sending moment when the competition resources are available.

Optionally, if the RN configures the high priority level BSR reporting manner, when the RN receives a high priority level BSR sent by a UE or receives high priority level data, the RN performs high priority level BSR report, and sets the BSR reporting state to already triggering the high priority level BSR.

Step 402: The RN judges whether uplink transmission resources are currently available. If the uplink transmission resources are currently available, the procedure proceeds to step 404; if the uplink transmission resources are not currently available, the procedure proceeds to step 403.

Step 403: The RN waits for available uplink transmission resources. After the uplink transmission resources are obtained, the procedure proceeds to step 404.

The manner of the obtaining, by the RN, the uplink transmission resources includes the following:

If the BSR reporting manner of the RN is configured to be the BSR periodic reporting manner, the RN obtains configured resources in an RRC Connection Reconfiguration message sent by the D-eNB or resources in a message sent by the D-eNB and borne by an R-PDCCH. When the uplink transmission resources are available, the uplink transmission resources are used to send the BSR. The condition of sending the BSR further includes: when a triggered BSR exists or a current buffer has data, the uplink transmission resources are used to send the BSR.

In addition, if the BSR reporting manner of the RN is configured to be the BSR reporting manner of periodic reporting, and the BSR reporting manner of high priority level BSR and SR resources dedicated to the high priority level BSR reporting manner are configured, and if it is determined that the high priority level BSR reporting is required to be performed between two times periodic BSR reporting, the dedicated SR resources may be used; an SR message is sent; and BSR reporting resources are requested for. If the BSR reporting manner of the RN is configured to be the BSR reporting manner of periodic reporting, and the high priority level BSR reporting manner and competition resources of the high priority level BSR reporting are configured, and if it is determined that the high priority level BSR reporting is required to be performed between two times of periodic BSR reporting, the competition resources may be used, and the high priority level BSR is reported. Specifically, the determining that the high priority level BSR reporting is required to be performed is: receiving, by the RN, the high priority level BSR, or receiving high priority level data.

If the BSR reporting manner of the RN is configured to be the BSR reporting manner of SR request, when the RN triggers the BSR reporting required to be performed, the RN sends an SR request to the D-eNB; the SR request is used to request the D-eNB to allocate BSR resources to the SN; and the BSR resources are used for BSR reporting. A first timer may be included in the RN. The first timer is configured to forbid, within a time counting period of the first timer, the RN triggering the SR request triggered by the reporting manner of SR request, thereby preventing the RN from sending SR request information to the D-eNB too frequently. The period of the timer may be configured by the D-eNB. The first timer is started when the SR request is sent to the D-eNB successfully and after UL grant information (uplink transmission grant information) is received.

If the BSR reporting manner of the RN is configured to be the BSR reporting manner of SR request, and the reporting manner of high priority level BSR is configured, the reporting of high priority level BSR may not be limited by the timer. That is, in the time counting period of the first timer, if the reporting of high priority level BSR is triggered, the RN performs the reporting of high priority level BSR.

If the BSR reporting manner of the RN is configured to be the BSR reporting manner of SR request, and the reporting manner of high priority level BSR is configured, the reporting of high priority level BSR may use SR resources configured for the reporting manner of SR request.

Step 404: The RN bears an amount of data in the current buffer and capable of being actually transmitted in a BSR report.

The RN may further determine a UE required to be scheduled. If channel quality of the UE is greater than a preset second threshold value, the amount of data, which is required to be scheduled, of the UE is added up, or an amount of data which is already decided to be scheduled but not received yet and an amount of data in the current buffer and capable of being actually transmitted are added up, and an adding result is borne in the BSR report sent to the D-eNB. Optionally, the RN may further bear the amount of data, which is already decided to be scheduled but is not received, of the UE and the amount of data in the current buffer of the RN and capable of being actually transmitted respectively in the BSR report sent to the D-eNB.

The channel quality may be uplink transmission quality of the UE or downlink transmission quality, or both the uplink transmission quality and the downlink transmission quality are taken into consideration. In addition, the channel quality may specifically be an SINR (Signal Interference Noise Ratio, signal interference noise ratio), and may further include received power and strength of a received signal.

The RN determines the UE required to be scheduled and with the channel quality greater than the preset second threshold value. The RN performs grouping according to priority levels of data required to be scheduled, adds up the amount of the grouped data by group, that is, adds up the amount of data of the same priority level, and respectively bears adding results of data of different priority levels in the BSR report sent to the D-eNB. The adding up the amount of the grouped data by group may be adding up the amount of data decided to be scheduled but not buffered and the amount of data in the current buffer and capable of being actually transmitted, or adding up the amount of data decided to be scheduled but not buffered.

A calculation manner of adding up scheduling results may be configured fixedly, or may be configured through an RRC message by the D-eNB for the RN.

Step 405: The RN sends the BSR to the D-eNB.

In the embodiment of the present invention, the BSR triggering method of the RN, the method of reporting early the scheduling result of the UE to the D-eNB, and the method of using periodic BSR reporting in a certain condition, which are provided by the embodiment of the present invention, are employed, so as to reduce time delay of sending of uplink data in the network including the RN node. Through the method of determining whether to report a scheduling result to the D-eNB according to the channel quality, accuracy of the BSR report may be improved.

Figure 5:
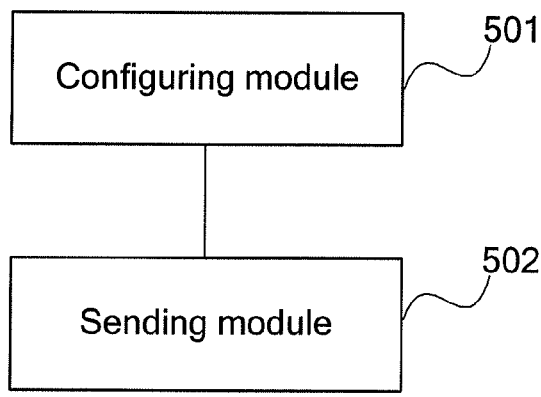
FIG. 5 is a structure diagram of a relay node according to an embodiment of the present invention.

The structure and functions of a Donor eNB D-eNB are illustrated below in detail with reference to FIG. 5. As shown in FIG. 5.

The Donor eNB D-eNB includes a configuring module 501 and a sending module 502. The configuring module 501 is configured to configure, according to the number of user equipments UEs managed by a relay node RN, a BSR reporting manner of the RN for the RN. The reporting manner includes a BSR reporting manner of periodic reporting and a BSR reporting manner of SR message. The reporting manner may also be the BSR reporting manner of periodic reporting and configured with a reporting manner of high priority level BSR. The reporting manner may also be the BSR reporting manner of SR message and configured with the reporting manner of high priority level BSR. The sending module 502 is configured to send the configured BSR reporting manner to the RN, so that the RN configures the BSR reporting manner, and sends a BSR to the Donor eNB D-eNB according to the configured BSR reporting manner.

In addition, the configuring module 501 may include a judging unit and a configuring unit. The judging unit is configured to determine that the number of the UEs managed by the RN is greater than a preset first threshold value. Correspondingly, the configuring unit is configured to configure the BSR reporting manner of periodic reporting for the RN when the judging unit determines that the number of the UEs managed by the RN is greater than the preset first threshold value. Or The judging unit is configured to determine the number of the UEs managed by the RN is smaller than or equal to the preset first threshold value. Correspondingly, the configuring unit is further configured to configure the reporting manner of SR request for the RN when the judging unit determines that the number of the UEs managed by the RN is smaller than or equal to the preset first threshold value.

The configuring unit may be configured to configure the BSR reporting manner of periodic reporting and the BSR reporting manner of high priority level BSR for the RN and configure resources for sending a high priority level BSR for the RN when the number of the UEs managed by the RN is greater than the preset first threshold value.

If the number of the UEs managed by the RN is smaller than or equal to the preset first threshold value, the reporting manner of SR request and the BSR reporting manner of high priority level BSR are configured for the RN, and resources for sending the high priority level BSR are configured for the RN.

A priority level of sending the high priority level BSR is higher than that of sending a BSR by using the BSR reporting manner of periodic reporting or the reporting manner of SR request.

The resources for sending the high priority level BSR include: when the BSR reporting manner of periodic reporting and the BSR reporting manner of high priority level BSR are configured for the RN, the resources for sending the high priority level BSR are dedicated SR resources or competition resources; when the reporting manner of SR request and the BSR reporting manner of high priority level BSR are configured for the RN, the resources for sending the high priority level BSR are SR resources configured for the reporting manner of SR request or dedicated SR resources.

Figure 6:
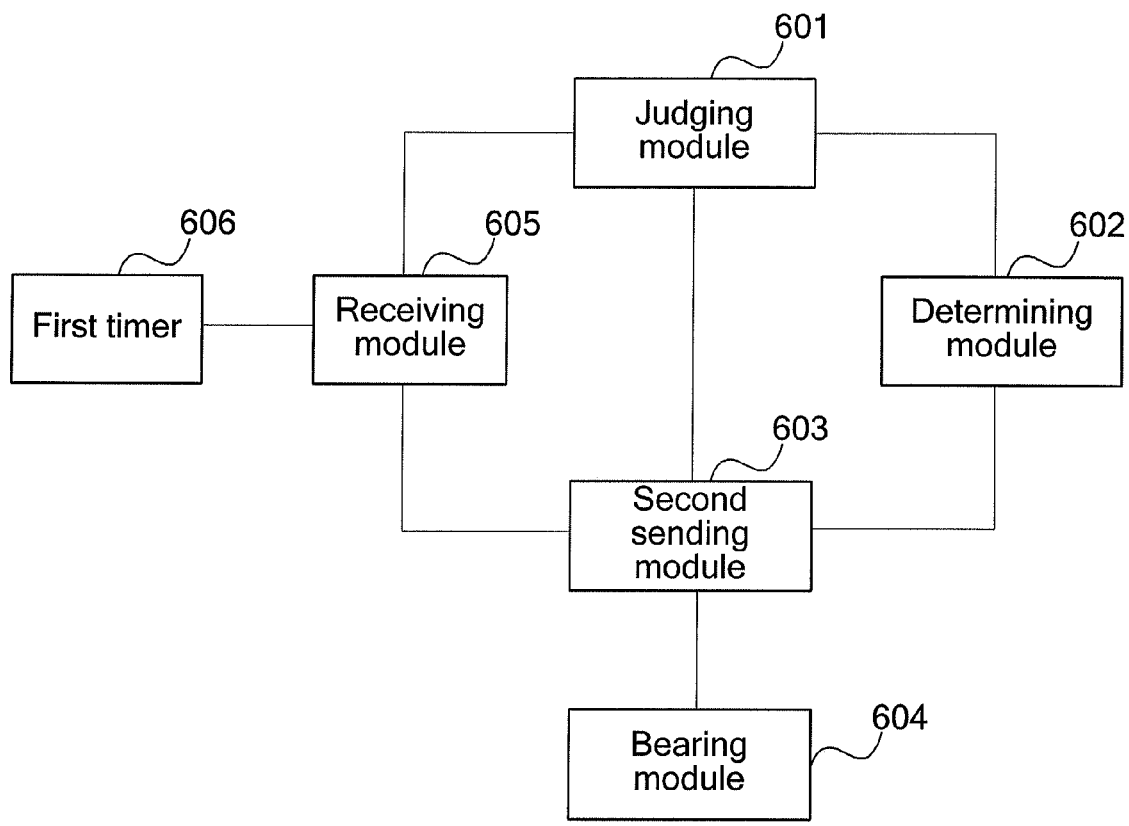
FIG. 6 is a structure diagram of a Donor eNB according to an embodiment of the present invention.

The structure and functions of a relay node RN provided by an embodiment of the present invention are illustrated below in detail with reference to FIG. 6.

The relay node may include a judging module 601 and a second sending module 603.

The judging module 601 is configured to configure a BSR reporting manner of the RN according to the number of user equipments UEs managed by the RN. The second sending module 603 is configured to send a BSR to a Donor eNB D-eNB according to the configured BSR reporting manner. Specifically, the BSR reporting manner may be a BSR reporting manner of periodic reporting, and may also be a BSR reporting manner of SR message or a BSR reporting manner of high priority level BSR. For various reporting manners, reference may be made to the descriptions in the above embodiments.

The judging module 601 may include a determining unit and a second configuring unit.

The determining unit is configured to determine the number of the UEs managed by the RN is greater than a preset third threshold value. The second configuring unit is configured to configure the BSR reporting manner of periodic reporting for the RN when the judging unit determines that the number of the UEs managed by the RN is greater than the preset third threshold value. Or The determining unit is configured to determine the number of the UEs managed by the RN is smaller than or equal to the preset third threshold value. The second configuring unit is configured to configure the reporting manner of SR request for the RN when the determining unit determines that the number of the UEs managed by the RN is smaller than or equal to the preset third threshold value.

The second configuring unit is further configured to configure the BSR reporting manner of periodic reporting and the BSR reporting manner of high priority level BSR for the RN and configure resources for sending a high priority level BSR for the RN when the number of the UEs managed by the RN is greater than the preset first threshold value.

If the number of the UEs managed by the RN is smaller than or equal to the preset first threshold value, the reporting manner of SR request and the BSR reporting manner of high priority level BSR are configured for the RN, and resources for sending the high priority level BSR are configured for the RN.

A priority level of sending the high priority level BSR is higher than that of sending a BSR by using the BSR reporting manner of periodic reporting or the reporting manner of SR request.

The relay node may further include a receiving module 605 and a determining module 602.

The receiving module 605 is configured to, if the BSR reporting manner of SR request is configured for the RN, receive a BSR or uplink data sent by a UE, and send first trigger information to the second sending module 603. The sending module 603 is configured to receive the first trigger information, and send the BSR of the RN to the D-eNB. The BSR is generated by the RN. Or, The determining module 602 is configured to send second trigger information to the second sending module 603 during a periodic sending moment if the BSR reporting manner of periodic reporting is configured for the RN and when it is determined that the competition resources are available. The second sending module 603 is further configured to send the BSR of the RN to the D-eNB after receiving the second trigger information. Or, The receiving module 605 is configured to, if the BSR reporting manner of high priority level BSR is configured for the RN, receive a high priority level BSR or high priority level data sent by a UE, and send third trigger information to the second sending module. The second sending module 603 is further configured to receive the third trigger information, and send the high priority level BSR of the RN to the D-eNB.

The relay node further includes a bearing module 604. The bearing module 604 is configured to bear an amount of data in a current buffer in the BSR that is sent to the D-eNB, and send the BSR to the second sending module 603. Or, the bearing module 604 is further configured to determine a UE required to be scheduled and with channel quality greater than a preset second threshold value, add up the amount of scheduled data of the UE, bear an adding result in the BSR sent to the D-eNB, and send the BSR to the second sending module 603. Or the bearing module 604 is further configured to determine a UE required to be scheduled and with channel quality greater than the second threshold value, where the RN performs grouping according to priority levels of data required to be scheduled, add up the grouped data by group, bear a group adding result in the BSR that is sent to the D-eNB, and send the BSR to the second sending module 603.

The relay node further includes a first timer 606. The first timer 606 is configured to forbid, within a time counting period of the first timer 606, the RN triggering an SR request triggered by the reporting manner of SR request, when the reporting manner of SR request is configured for the RN.

The first timer 606 is further configured to forbid, within a time counting period of the first timer 606, the RN triggering an SR request triggered by the reporting manner of SR request and permit sending an SR request triggered by the reporting manner of high priority level BSR if the reporting manner of SR request and the reporting manner of high priority level BSR are configured for the RN and the RN configures the first timer 606.

Figure 7:
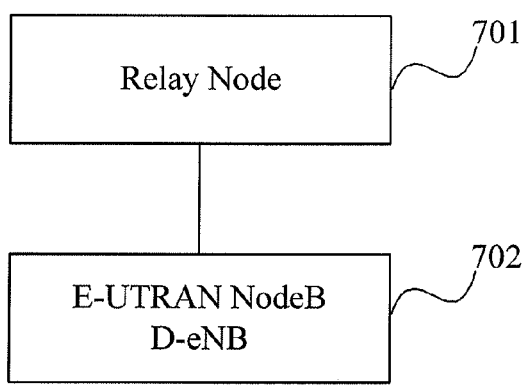
FIG. 7 is a structure diagram of a system for BSR reporting according to an embodiment of the present invention.

A system for BSR reporting provided by an embodiment of the present invention is illustrated below in detail with reference to FIG. 7. The system includes a relay node RN 701 and an E-UTRAN NodeB 702. The E-UTRAN NodeB is a D-eNB (Donor eNB). The D-eNB 702 is connected to the RN 701 in a communication-enabled manner.

The D-eNB 702 is configured to configure a BSR reporting manner of the RN 701 according to the number of UEs managed by an RN 701 managed by the D-eNB 702, and send the configured BSR reporting manner to the RN 701, so that the RN 701 configures the BSR reporting manner, and sends a BSR to the D-eNB 702 according to the configured BSR reporting manner.

The D-eNB 702 is further configured to configure a first timer for the RN 701 by sending a downlink message to the RN 701. The first timer is configured to forbid, within a time counting period of the first timer, the RN 701 sending an SR request to the D-eNB 702.

Further, the RN 701 is further configured to bear an amount of data in a current buffer in the BSR sent to the D-eNB 702; or determine a UE requiring scheduling and with channel quality greater than a preset second threshold value, add up the amount of data, required to be scheduled, of the UE or add up the amount of data decided to be scheduled but not received, bear an adding result in the BSR sent to the D-eNB;

or determine a UE required to be scheduled and with channel quality greater than the preset second threshold value. The RN 701 performs grouping according to priority levels of the data, adds up the amount of the grouped data by group, and bears a group adding result in the BSR sent to the D-eNB 702. The RN 701 sends the BSR to the D-eNB 702.

A buffer reporting method provided by an embodiment of the present invention is illustrated below in detail.

An RN may further determine a UE requiring resource scheduling to be performed. The UE requiring resource scheduling to be performed includes a UE which already sends data to the RN and the data is already stored in a buffer of the RN. The UE requiring resource scheduling to be performed may further include a UE to which UL Grant is sent to by the RN but the RN does not receive uplink data sent by the UE yet. Data, required to be scheduled, of the UE may include the data which is sent by the UE to the RN and the data is already stored in the buffer of the RN. The data required to be scheduled may further include uplink data which is not received and is sent by the UE to the RN, where the RN already sends UL Grant to the UE.

The RN may preset a channel quality threshold value. If the channel quality of the UE is greater than the preset channel quality threshold value, the amount of data, required to be scheduled, of the UE is added up. The amount of data required to be scheduled include the amount of data decided to be scheduled but not buffered, and may further include the amount of data in the current buffer and capable of being actually transmitted. An adding result is borne in the BSR report sent to the D-eNB. Optionally, the RN may further add up the amount of data, decided to be scheduled but not buffered, of the UE, and bears an adding result and the amount of data in the current buffer and capable of being actually transmitted in the BSR report sent to the D-eNB.

The channel quality may be uplink transmission quality of the UE or downlink transmission quality, or both the uplink transmission quality and the downlink transmission quality are taken into consideration. In addition, the channel quality may specifically be an SINR (Signal Interference Noise Ratio, signal interference noise ratio), and may further include received power and strength of a received signal.

The RN determines the UE requiring the scheduling and with the channel quality greater than the preset channel quality threshold value. The RN performs grouping according to priority levels of data, which is required to be scheduled, of the UE, add up the amount of the grouped data by group, that is, add up the amount of data of the same priority level, and respectively bears adding results of data of different priority levels in the BSR report that is sent to the D-eNB. The amount of data for group accumulation may include the amount of data buffered in the RN, may further the amount of data decided to be scheduled but not buffered and the amount of data in the current buffer and capable of being actually transmitted.

A calculation manner of adding up the amount of data required to be scheduled may be configured fixedly, or may be configured through an RRC message by the D-eNB for the RN.

Figure 8:
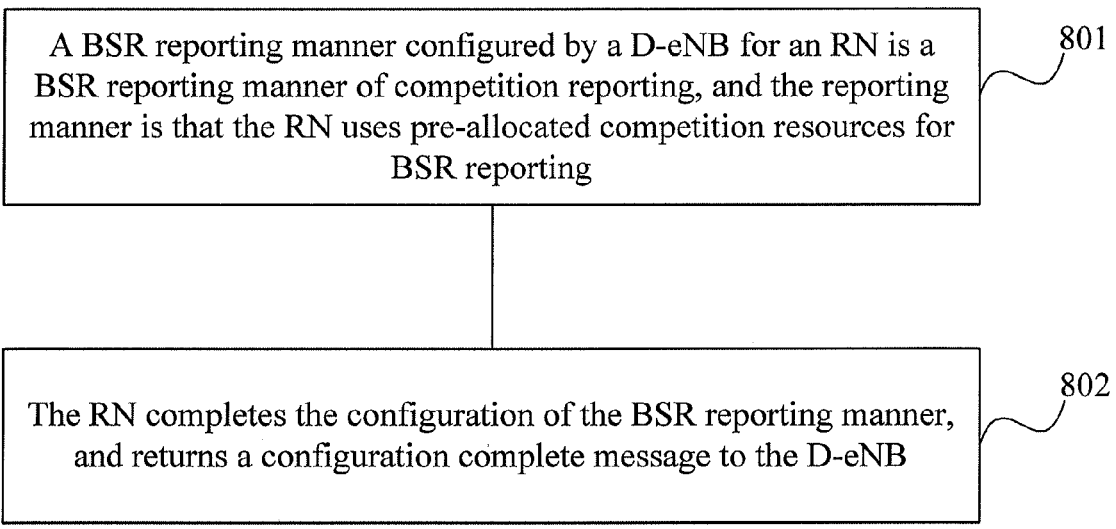
FIG. 8 is a flow chart of still another method for BSR reporting according to an embodiment of the present invention.

Another method for BSR reporting provided by an embodiment of the present invention is illustrated below in detail with reference to FIG. 8.

Step 801: A BSR reporting manner configured by a D-eNB for an RN is a BSR reporting manner of competition reporting. The reporting manner is that the RN uses pre-allocated competition resources for BSR reporting.

The pre-allocated competition resources may be configured by the D-eNB by using an RRC Connection Reconfiguration message. Configured contents may include pre-configured uplink transmission resources. If the competition resources are periodically used resources, the configured contents may include a period used by the competition resources and a specifically used sub-frame. In addition, the pre-allocated competition resources may also be allocated by the D-eNB through a message borne by an R-PDCCH.

Step 802: The RN completes the configuration of the BSR reporting manner, and returns a configuration complete message to the D-eNB.

Optionally, if the D-eNB uses an RRC message to configure the BSR reporting manner of competition reporting, the RN may send an RRC Connection Reconfiguration Complete message to the D-eNB to notify the D-eNB that the RN completes the configuration of the BSR reporting manner.

If the BSR reporting manner configured for the RN is competition reporting, after the RN is triggered to perform the BSR reporting, the RN reports a BSR according to the competition resources configured by the D-eNB. When the competition resources are used by a group of or all of RNs managed by the D-eNB, a collision may occur. If a collision occurs, and after a corresponding RN retreats, the BSR is re-sent. A method for detecting the occurrence of collision may be: after the RN sends the BSR, if uplink data transmission grant is not received in a period of time, the RN judges that the collision occurs.

Figure 9:
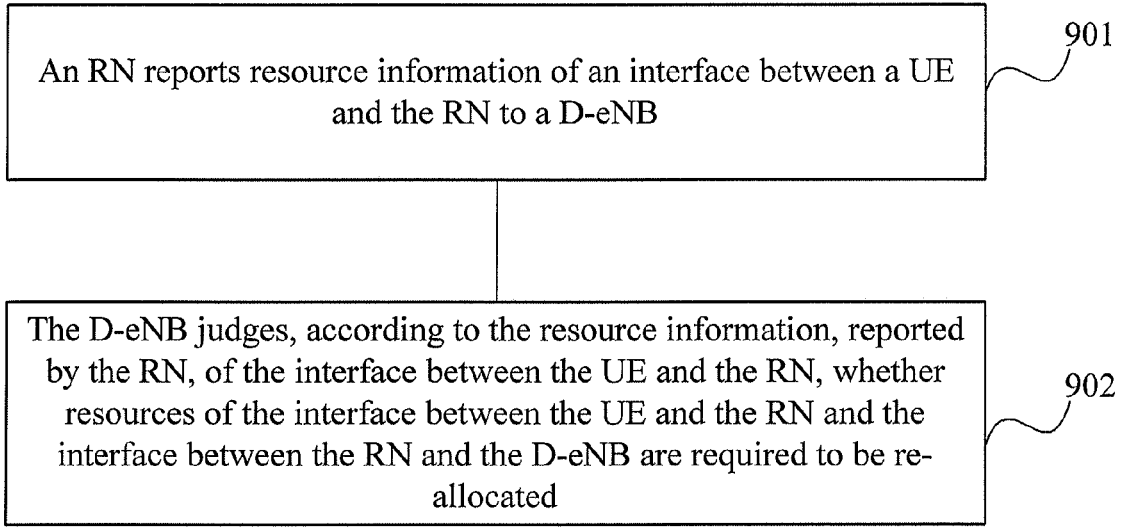
FIG. 9 is another method for buffer reporting according to an embodiment of the present invention.

Another method for an RN to report a buffer to a D-eNB is illustrated below in detail with reference to FIG. 9.

The number of UEs served by an RN changes dynamically, and channel quality of the Uu interface is also time-varying, so that fixed configuration of an MBSFN sub-frame for downlink Un interface transmission may incur the following two problems.

1. When Un interface resources are over allocated, the RN cannot obtain enough Uu interface resources to transmit arriving downlink data to UEs served by the RN, which causes a buffer occupation rate of the RN to rise increasingly, so as to increase time delay of transmission of downlink data. In a worst case, buffer overflow is incurred to the RN, so that packet loss occurs.

2. When the Un interface resources are insufficiently allocated, the Uu interface resources are abundant, no data is stranded in the RN, so that time delay of the buffer of the RN is decreased relatively and no overflow occurs, but the buffer and time delay on the DeNB increase. Meanwhile, the Uu interface can not obtain enough data for transmission, which wastes the Uu interface resources.

To sum up, the inventor finds that buffer reporting method in the prior art is not applicable to the interface between the RN and the D-eNB, so that the objective of the present invention is to design a reasonable buffer reporting and periodic Uu-Un interface resource allocation coordination method for the interface between the RN and the D-eNB.

Step 901: An RN reports resource information of an interface between a UE and the RN to a D-eNB.

A manner through which the RN reports the resource information of the interface between the UE and the RN to the D-eNB may be reporting through an MAC (Media Access Control, media access control) control unit or by extending an RRC message.

The resource information of the interface between the UE and the RN may include buffer information of downlink data of the RN, spectral utilization efficiency of the interface between the UE and the RN in a current resource allocation configuration situation or expected spectral efficiency of the interface between the UE and the RN in a next allocation period.

The buffer information may use the RN as a unit, and may also use a radio bearer combination of the RN as a unit.

The reporting manner may be periodic reporting, and may also be event-triggered reporting.

If the reporting manner is the periodic reporting, a reporting period may be configured through the D-eNB, and may also be a reporting period fixed by the system.

If the reporting manner is the event-triggered reporting, an event for triggering the report may be: when the resource information, monitored by the RN for reporting, of the interface between the UE and the RN is greater than a preset threshold, the resource information is reported; when the resource information, monitored by the RN for reporting, of the interface between the UE and the RN is not greater than a preset threshold, the resource information is not reported.

Step 902: The D-eNB judges, according to the resource information, reported by the RN, of the interface between the UE and the RN, whether resources of the interface between the UE and the RN and the interface between the RN and the D-eNB are required to be re-allocated.

The method for judging may be as follows:

If reported information is buffer information of downlink data of the RN, the D-eNB calculates spectral utilization efficiency of the interface between the UE and the RN, with which calculated spectral utilization efficiency of the interface between the D-eNB and the RN is compared. If the spectral utilization efficiency of the interface between the UE and the RN is greater than the spectral utilization efficiency of the interface between the RN and the D-eNB, the resources of the interface between the RN and the D-eNB are increased, and the resources of the interface between the UE and the RN are decreased. If the spectral utilization efficiency of the interface between the UE and the RN is not greater than the spectral utilization efficiency of the interface between the RN and the D-eNB, the resources of the interface between the RN and the D-eNB are decreased, and the resources of the interface between the UE and the RN are increased. Preferably, the resource adjustment may be performed when considering the size of the buffer of the RN.

If reported information is the spectral utilization efficiency, calculated by the RN, of the interface between the UE and the RN, the spectral utilization efficiency is compared with the calculated frequency utilization efficiency of the interface between the D-eNB and the RN. If the spectral utilization efficiency of the interface between the UE and the RN is greater than the spectral utilization efficiency of the interface between the RN and the D-eNB, the resources of the interface between the RN and the D-eNB are increased, and the resources of the interface between the UE and the RN are decreased. If the spectral utilization efficiency of the interface between the UE and the RN is not greater than the spectral utilization efficiency of the interface between the RN and the D-eNB, the resources of the interface between the RN and the D-eNB are decreased, and the resources of the interface between the UE and the RN are increased.

If the reported information is expected spectral efficiency, calculated by the RN, of the interface between the UE and the RN in a next allocation period, with which the D-eNB compares the calculated frequency utilization efficiency of the interface between the UE and the RN. If the expected spectral utilization efficiency of the interface between the UE and the RN is greater than the existing spectral utilization efficiency of the interface between the UE and the RN, the resources of the interface between the UE and the RN are increased, the resource of the interface between the RN and the D-eNB are decreased. If the expected spectral utilization efficiency of the interface between the UE and the RN is not greater than the existing spectral utilization efficiency of the interface between the UE and the RN, the resources of the interface between the UE and the RN are decreased, the resource of the interface between the RN and the D-eNB are increased.

Figure 10:
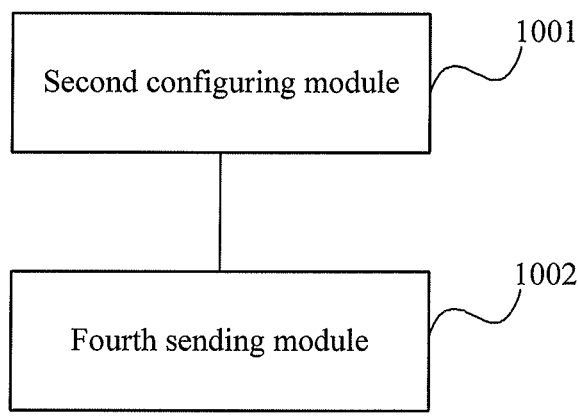
FIG. 10 is a structure diagram of another Donor eNB D-eNB according to an embodiment of the present invention.

A Donor eNB D-eNB is illustrated below in detail with reference to FIG. 10. The Donor eNB D-eNB may be configured to perform BSR reporting in a competition manner.

The Donor eNB D-eNB includes a second configuring module 1001 and a fourth sending module 1002. The second configuring module 1001 is configured to configure a BSR reporting manner of competition reporting for a relay node RN. The fourth sending module 1002 is configured to send the configured BSR reporting manner of competition reporting to the RN. The RN configures the BSR reporting manner, and reports a BSR to the Donor eNB D-eNB according to the configured BSR reporting manner of competition reporting.

Figure 11:
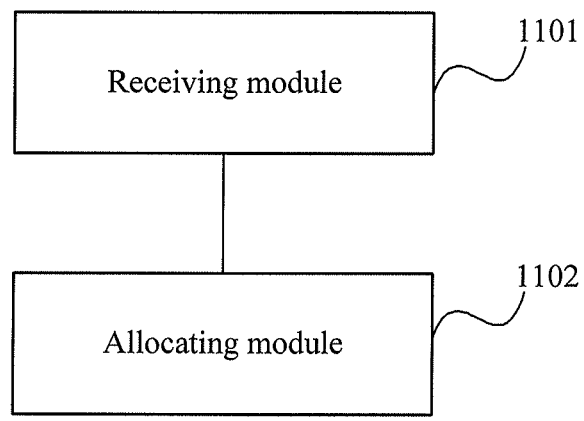
FIG. 11 is a structure diagram of yet another Donor eNB according to an embodiment of the present invention.

A Donor eNB D-eNB is illustrated below in detail with reference to FIG. 11. The Donor eNB D-eNB may be used for resource allocation of an interface between a UE and an RN and an interface between the RN and a D-eNB.

The D-eNB includes a receiving module 1101 and an allocating module 1102. The receiving module 1101 is configured to receive resource information, which is reported by the relay node RN, of the interface between the terminal equipment UE and the relay node RN. The allocating module 1102 is configured to re-allocate resources of the interface between the UE and the RN and the interface between the RN and the D-eNB according to the resource information, which is reported by the relay node RN, of the interface between the terminal equipment UE and the relay node RN.

The allocating module 1102 further includes a judging unit and an allocation unit. The judging unit is configured to calculate spectral utilization efficiency of the interface between the UE and the RN if reported resource information is buffer information of downlink data of the RN, compare the calculated spectral utilization efficiency of the interface between the UE and the RN with calculated spectral utilization efficiency of the interface between the D-eNB and the RN, and judge that the spectral utilization efficiency of the interface between the UE and the RN is greater than the spectral utilization efficiency of the interface between the RN and the D-eNB. The allocation unit is further configured to decrease resources of the interface between the UE and the RN when the judging unit judges that the spectral utilization efficiency of the interface between the UE and the RN is greater than the spectral utilization efficiency of the interface between the RN and the D-eNB.

The judging unit is further configured to, if reported resource information is buffer information of downlink data of the RN, calculate spectral utilization efficiency of the interface between the UE and the RN, compare the calculated spectral utilization efficiency of the interface between the UE and the RN with calculated spectral utilization efficiency of the interface between the D-eNB and the RN, and judge that the spectral utilization efficiency of the interface between the UE and the RN is smaller than or equal to the spectral utilization efficiency of the interface between the RN and the D-eNB.

The allocation unit is further configured to decrease resources of the interface between the RN and the D-eNB and increase the resources of the interface between the UE and the RN when the judging unit judges that the spectral utilization efficiency of the interface between the UE and the RN is smaller than or equal to the spectral utilization efficiency of the interface between the RN and the D-eNB.

The judging unit is further configured to, if the reported resource information is the spectral utilization efficiency of the interface between the UE and the RN, compare the reported spectral utilization efficiency of the interface between the UE and the RN with calculated spectral utilization efficiency of the interface between the D-eNB and the RN, and judge that the spectral utilization efficiency of the interface between the UE and the RN is greater than the spectral utilization efficiency of the interface between the RN and the D-eNB.

The allocation unit is further configured to increase the resources of the interface between the RN and the D-eNB and decrease the resources of the interface between the UE and the RN when the judging unit judges that the spectral utilization efficiency of the interface between the UE and the RN is greater than the spectral utilization efficiency of the interface between the RN and the D-eNB.

The judging unit is further configured to, if the reported resource information is the spectral utilization efficiency of the interface between the UE and the RN, compare the reported spectral utilization efficiency of the interface between the UE and the RN with the calculated frequency utilization efficiency of the interface between the D-eNB and the RN, and judge that the spectral utilization efficiency of the interface between the UE and the RN is smaller than or equal to the spectral utilization efficiency of the interface between the RN and the D-eNB.

The allocation unit is further configured to decrease the resources of the interface between the RN and the D-eNB and increase the resources of the interface between the UE and the RN when the judging unit judges that the spectral utilization efficiency of the interface between the UE and the RN is smaller than or equal to the spectral utilization efficiency of the interface between the RN and the D-eNB.

The judging unit is further configured to, if the reported resource information is expected spectral efficiency, calculated by the RN, of the interface between the UE and the RN in a next allocation period, compare the expected spectral efficiency, calculated by the RN, of the interface between the UE and the RN in the next allocation period with the calculated frequency utilization efficiency of the interface between the UE and the RN, and judge that the expected spectral efficiency of the interface between the UE and the RN is greater than the existing spectral utilization efficiency of the interface between the UE and the RN.

The allocation unit is further configured to increase the resources of the interface between the UE and the RN and decrease the resources of the interface between the RN and the D-eNB when the judging unit judges that the expected spectral efficiency of the interface between the UE and the RN is greater than the existing spectral utilization efficiency of the interface between the UE and the RN.

The judging unit is further configured to, if the reported resource information is expected spectral efficiency, calculated by the RN, of the interface between the UE and the RN in a next allocation period, compare the expected spectral efficiency, calculated by the RN, of the interface between the UE and the RN in the next allocation period with the calculated frequency utilization efficiency of the interface between the UE and the RN, and judge that the expected spectral efficiency of the interface between the UE and the RN is smaller than or equal to the existing spectral utilization efficiency of the interface between the UE and the RN.

The allocation unit is further configured to decrease the resources of the interface between the UE and the RN and increase the resources of the interface between the RN and the D-eNB when the judging unit judges that the expected spectral efficiency of the interface between the UE and the RN is smaller than or equal to the existing spectral utilization efficiency of the interface between the UE and the RN.

It should be understood by persons skilled in the art that, assignment of devices and modules in the embodiments of the present invention is functional assignment. An actual specific structure may be a division or combination of the functional modules.

"Receive" in the above embodiments of the present invention may be construed as actively obtaining information from other units or receiving information sent by one or more other units.

The sequence numbers of the above embodiments of the present invention are merely for the convenience of description, and do not imply merits or demerits of the embodiments.

Solutions specified in the claims also fall within the protection scope of the embodiments of the present invention.

Persons of ordinary skill in the art may understand that, all of or a part of the steps in the method according to the embodiments may be implemented by a program instructing relevant hardware. The program may be stored in a computer readable storage medium.

The above descriptions are merely exemplary embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for reporting BSR (buffer status report), comprising, obtaining, by a D-eNB(Donor eNB), the number of UEs (user equipments) managed by a relay node (RN), wherein the RN is an RN managed by the D-eNB; and determining, by the D-eNB, a BSR report of the RN according to the number of the user equipments (UEs) managed by the RN, and sending the BSR report to the RN, so that the RN configures the BSR report and sending a BSR of the RN to the D-eNB according to the BSR report wherein when the number of the UEs managed by the RN is greater than a preset first threshold value, determining, by the D-eNB, that the BSR reporting of the RN is a BSR reporting of periodic reporting; and when the number of the UEs managed by the RN is smaller than or equal to the preset first threshold value, determining, by the D-eNB, that the BSR reporting of the RN is a reporting of scheduling request SR request, wherein the BSR of SR request comprises the RN sending an SR request to the D-eNB, and the SR request is used to request the D-eNB to allocate BSR resources to the RN, such that the RN uses the BSR resources to send the BSR to the D-eNB.

2. The method according to claim 1, wherein the method further comprises:

if the D-eNB configures the BSR report of periodic reporting for the RN, configuring a period length of periodic BSR reporting for the RN according to the number of the UEs managed by the RN, or configuring a period length of the periodic BSR reporting and fixed competition resources used in the periodic reporting for the RN according to the number of the UEs managed by the RN;

or, if the BSR report of SR request is configured for the RN, configuring for the RN resources used for sending an SR request.

3. The method according to claim 1, wherein the determining, by the D-eNB, the BSR report of the RN according to the number of the user equipments UEs managed by the RN comprises:
  if the number of the UEs managed by the RN is greater than a preset first threshold value, determining, by the D-eNB, that the BSR report of the RN is a BSR report of periodic reporting and a BSR report of high priority level BSR, and configuring for the RN resources for sending a high priority level BSR, wherein the BSR report of high priority level BSR is used to send a high priority level BSR, a priority level of sending the high priority level BSR is higher than that of sending a BSR by using the BSR report of periodic reporting, and the resources for sending the high priority level BSR are dedicated SR resources or competition resources; and
  if the number of the UEs managed by the RN is smaller than or equal to the preset first threshold value, determining, by the D-eNB, that the BSR report of the RN is a BSR reporting manner of SR request and a BSR report of high priority level BSR, and configuring for the RN resources for sending a high priority level BSR, wherein the BSR report of SR request comprises sending an SR request to the D-eNB, the SR request is used to request the D-eNB to allocate BSR resources to the RN, so that the RN uses the BSR resources to send a BSR to the D-eNB, the BSR report of high priority level BSR is used to send a high priority level BSR, a priority level of sending the high priority level BSR is higher than that of sending a BSR by using the BSR report of SR request, and the resources for sending the high priority level BSR are SR resources configured for the BSR report of SR request or dedicated SR resources.

4. The method according to claim 3, wherein the configuring, by the RN, the BSR report and sending the BSR of the RN to the D-eNB according to the BSR reporting manner comprises:
  if the BSR reporting manner of SR request is configured for the RN and the RN receives a BSR or uplink data sent by a UE, sending, by the RN, a BSR of the RN to the D-eNB; or
  if the BSR reporting manner of periodic reporting is configured for the RN and competition resources are available, sending, by the RN, a BSR of the RN to the D-eNB during a periodic sending moment; or
  if the BSR report of periodic reporting and the BSR report of high priority level BSR are configured for the RN, or the BSR report of SR request and the BSR report of high priority level BSR are configured for the RN, receiving, by the RN, a high priority level BSR or high priority level data sent by the UE, and sending a high priority level BSR of the RN to the D-eNB.

5. The method according to claim 4, wherein if the BSR report of SR request is configured for the RN, and the RN receives the BSR or the uplink data sent by the UE, the triggering the sending the BSR of the RN to the D-eNB comprises:
  if the BSR report of SR request is configured for the RN, after the RN receives the BSR or the uplink data sent by the UE, sending, by the RN, an SR request to the D-eNB, wherein the SR request is used to request the D-eNB to allocate BSR resources to the RN, and the RN uses the BSR resources allocated by the D-eNB to send the BSR to the D-eNB; or
  if the BSR report of periodic reporting and the BSR report of high priority level BSR are configured for the RN, or the BSR report of SR request and the BSR report of high priority level BSR are configured for the RN, the receiving, by the RN, the high priority level BSR or the high priority level data sent by the UE, and the sending the high priority level BSR of the RN to the D-eNB comprise:
  if the BSR report of periodic reporting and the BSR report of high priority level BSR are configured for the RN, or the BSR report of SR request and the BSR report of high priority level BSR are configured for the RN, after the RN receives the high priority level BSR or the high priority level data sent by the UE, using, by the RN, the dedicated SR resources to send the SR request to the D-eNB, wherein the SR request is used to request the D-eNB to allocate BSR resources to the RN, the RN uses the BSR resources allocated by the D-eNB or uses the competition resources to send the high priority level BSR to the D-eNB.

6. The method according to claim 1, wherein before the sending, by the RN, the BSR to the D-eNB according to the configured BSR report, the method further comprises:
  bearing an amount of data stored in a current buffer of the RN in the BSR sent to the D-eNB; or
  determining, by the RN, a UE required to be scheduled and with channel quality greater than a preset second threshold value, adding up the amount of data required to be scheduled of the UE or adding up the amount of data decided to be scheduled but not received, and bearing an adding result in the BSR sent to the D-eNB; or
  determining, by the RN, a UE needed to be scheduled and with channel quality greater than the preset second threshold value, grouping data according priority levels of the data required to be scheduled, adding up the amount of grouped data by group, and bearing a group adding result in the BSR sent to the D-eNB.

7. A method for buffer status report BSR reporting, comprising,
  determining, by a relay node RN, a BSR report of the RN according to the number of user equipments UEs managed by the RN;
  sending, by the RN, the determined BSR report of the RN to a Donor eNB D-eNB, so that the Donor eNB configures the BSR report for the RN; and
  sending, by the RN, a BSR of the RN to the D-eNB through the BSR report wherein when the number of the UEs managed by the RN is greater than a preset first threshold value, determining, by the RN, a BSR of periodic reporting for the RN; when the number of the UEs managed by the RN is smaller than or equal to the preset first threshold value, determining, by the RN, a BSR reporting of SR request for the RN, wherein the BSR reporting of SR request comprises the RN sends an SR request to the D-eNB, and the SR request is used to request the D-eNB to allocate BSR resources to the RN, so that the RN uses the BSR resources to send the BSR to the D-eNB.

8. The method according to claim 7, wherein the determining, by the relay node RN, the BSR report of the RN according to the number of the user equipments UEs managed by the RN comprises:
  if the number of the UEs managed by the RN is greater than a preset first threshold value, determining, by the RN, the BSR report of periodic reporting and a BSR report of high priority level BSR for the RN, and configuring resources for sending a high priority level BSR for the RN, wherein the BSR report of high priority level BSR is used to send a high priority level BSR, a priority level of sending the high priority level BSR is higher than that of sending a BSR by using the BSR report of periodic reporting, and the resources for sending the high priority level BSR are dedicated SR resources or competition resources; and if the number of the UEs managed by the RN is smaller than or equal to the preset first threshold value, determining, by the RN, the BSR report of SR request and the BSR report of high priority level BSR for the RN, and configuring resources for the RN for sending the high priority level BSR, wherein the BSR report of SR request comprises sending an SR request to the D-eNB, the SR request is used to request the D-eNB to allocate BSR resources to the RN, so that the RN uses the BSR resources to send a BSR to the D-eNB, the BSR report of high priority level BSR is used to send a high priority level BSR, a priority level of sending the high priority level BSR is higher than that of sending a BSR by using the BSR report of SR request, and the resources for sending the high priority level BSR are SR resources configured for the BSR report of SR request or dedicated SR resources.

9. The method according to claim 8, wherein the sending, by the RN, the BSR of the RN to the D-eNB through the BSR report comprises:

if the BSR report of SR request is configured for the RN and the RN receives a BSR or uplink data sent by a UE, triggering, by the RN, sending a BSR of the RN to the D-eNB; or if the BSR report of periodic reporting is configured for the RN and competition resources are available, sending, by the RN, a BSR of the RN to the D-eNB during a periodic sending moment; or if the BSR report of periodic reporting and the BSR report of high priority level BSR are configured for the RN or the BSR reporting manner of SR request and the BSR report of high priority level BSR are configured for the RN, receiving, by the RN, a high priority level BSR or high priority level data sent by the UE, and sending a high priority level BSR of the RN to the D-eNB.

10. The method according to claim 8, wherein if the BSR report of SR request is configured for the RN, and the RN receives the BSR or the uplink data sent by the UE, the triggering the sending the BSR of the RN to the D-eNB comprises:

if the BSR report of SR request is configured for the RN, after the RN receives the BSR or the uplink data sent by the UE, sending, by the RN, an SR request to the D-eNB, wherein the SR request is used to request the D-eNB to allocate BSR resources to the RN, and the RN uses the BSR resources allocated by the D-eNB to send the BSR to the D-eNB; or if the BSR report of periodic reporting and the BSR report of high priority level BSR are configured for the RN, or the BSR report of SR request and the BSR report of high priority level BSR are configured for the RN, the receiving, by the RN, the high priority level BSR or the high priority level data sent by the UE, and the sending the high priority level BSR to the D-eNB comprise:

if the BSR report of periodic reporting and the BSR report of high priority level BSR are configured for the RN, or the BSR report of SR request and the BSR report of high priority level BSR are configured for the RN, after the RN receives the high priority level BSR or the high priority level data sent by the UE, using, by the RN, the dedicated SR resources to send the SR request to the D-eNB, wherein the SR request is used to request the D-eNB to allocate BSR resources to the RN, and the RN uses the BSR resources allocated by the D-eNB or uses competition resources to send the high priority level BSR to the D-eNB.

11. The method according to claim 7, wherein before the sending, by the RN, the BSR to the D-eNB Donor eNB according to the configured BSR report, the method further comprises:

bearing, by the RN, an amount of data stored in a current buffer of the RN in the BSR sent to the D-eNB; or determining, by the RN, a UE required to be scheduled and with channel quality greater than a preset second threshold value, adding up the amount of data required to be scheduled of the UE or adding up the amount of data decided to be scheduled but not received, and bearing an adding result in the BSR sent to the D-eNB; or determining, by the RN, a UE required to be scheduled and with channel quality greater than the preset second threshold value, grouping data according priority levels of the data required to be scheduled, adding up the amount of grouped data by group, and bearing a group adding result in the BSR sent to the D-eNB.

12. A D-eNB(Donor eNB), wherein the D-eNB comprises relevant hardware executing program codes stored in a non-transitory computer-readable storage medium as a plurality of modules and units, wherein the plurality of modules comprise at least: a configuring module and a sending module which cause the relevant hardware to perform respective functions, wherein:

the configuring module causes the relevant hardware to configure a BSR report of the RN for the RN according to the number of user equipments UEs managed by a relay node RN managed by the D-eNB; and the sending module causes the relevant hardware to send the BSR report configured by the configuring module to the RN, so that the RN configures the BSR report and sends a BSR of the RN to the Donor eNB D-eNB according to the configured BSR report wherein the judging unit causes the relevant hardware to determine that the number of the UEs managed by the RN is smaller than or equal to the preset first threshold value; and the configuring unit causes the relevant hardware to configure a reporting of SR request for the RN when the judging unit determines that the number of the UEs managed by the RN is smaller than or equal to the preset first threshold value, wherein the of SR request comprises the RN sends an SR request to the D-eNB, and the SR request is used to request the D-eNB to allocate BSR resources to the RN, so that the RN uses the BSR resources to send a BSR to the D-eNB.

13. The D-eNB according to claim 12, wherein the configuring unit further causes the relevant hardware to:

configure a BSR report of periodic reporting and a BSR report of high priority level BSR for the RN and configure resources for sending a high priority level BSR for the RN when the judging unit determines that the number of the UEs managed by the RN is greater than the preset first threshold value;

configure for the RN the report wherein the determining unit causes the relevant hardware to determine that the number of the UEs managed by the RN is smaller than or equal to the preset third threshold value; and the second configuring unit causes the relevant hardware to configure a of SR request for the RN when the determining unit determines that the number of the UEs managed by the RN is smaller than or equal to the preset third threshold value, the reporting of SR request comprises the RN sends an SR request to the D-eNB, and the SR request is used to request the D-eNB to allocate BSR resources to the RN, so that the RN uses the BSR resources to send a BSR to the D-eNB of SR request and the BSR report of high priority level BSR and configure the resources for the RN for sending the high priority level BSR if the judging unit determines that the number of the UEs managed by the RN is smaller than or equal to the preset first threshold value;

wherein a priority level of sending the high priority level BSR is higher than that of sending a BSR using the BSR report of periodic reporting or the report of SR request.

14. A relay node RN, wherein the relay node RN comprises a judging module and a second sending module, wherein
the judging module causes the relevant hardware to configure a BSR report of the RN according to the number of UEs managed by the RN; and
the second sending module causes the relevant hardware to send a BSR of the RN to a Donor eNB D-eNB according to the configured BSR report.

15. The relay node according to claim 14, wherein
the second configuring unit further causes the relevant hardware to:
configure a BSR report of periodic reporting and a BSR report of high priority level BSR for the RN and configure for the RN resources for sending a high priority level BSR when the determining unit determines the number of the UEs managed by the RN is greater than a preset third threshold value;
configure the report of SR request and the BSR report of high priority level BSR for the RN, and configure for the RN the resources for sending the high priority level BSR if the determining unit determines the number of the UEs managed by the RN is smaller than or equal to the preset third threshold value;

wherein a priority level of sending the high priority level BSR is higher than that of sending a BSR by using the BSR report of periodic reporting or the report of SR request.

16. The relay node according to claim 15, wherein the relay node further comprises a receiving module and a determining module, wherein
the receiving module causes the relevant hardware to receive a BSR or uplink data sent by a UE and send first trigger information to the second sending module if the BSR reporting manner of SR request is configured for the RN;
the second sending module causes the relevant hardware to receive the first trigger information and send the BSR of the RN to the D-eNB; or
the determining module causes the relevant hardware to determine that competition resources are available and send second trigger information to the second sending module during a periodic sending moment if the BSR report of periodic reporting is configured for the RN;
the second sending module further causes the relevant hardware to receive the second trigger information and send the BSR of the RN to the D-eNB; or
the receiving module causes the relevant hardware to receive a high priority level BSR or high priority level data sent by a UE and send third trigger information to the second sending module if the BSR report of high priority level BSR is configured for the RN; and
the second sending module further causes the relevant hardware to receive the third trigger information and send the high priority level BSR of the RN to the D-eNB.

* * * * *